United States Patent [19]

Elias

[11] Patent Number: 5,245,178
[45] Date of Patent: Sep. 14, 1993

[54] APPARATUS FOR AUTOMATICALLY TESTING SAFETY LIGHT CURTAIN AND MEASURING MACHINE STOPPAGE TIME

[75] Inventor: Leonard W. Elias, Highland, Mich.

[73] Assignee: MagneTek Controls, Clawson, Mich.

[21] Appl. No.: 933,111

[22] Filed: Aug. 21, 1992

[51] Int. Cl.⁵ .......................... G01V 9/04; G08B 13/18
[52] U.S. Cl. ................................. 250/221; 250/222.1; 340/556; 324/177
[58] Field of Search ................ 250/221, 222.1, 223 R; 340/555-557; 73/5, 1 D, 488, 509-510; 324/177, 178

[56] References Cited

U.S. PATENT DOCUMENTS

| | | | |
|---|---|---|---|
| 3,746,863 | 7/1973 | Pronovost | 250/221 |
| 4,249,074 | 2/1981 | Bettler et al. | 250/221 |
| 4,446,602 | 5/1984 | Marx et al. | 250/221 |
| 4,520,262 | 5/1985 | Denton | 250/221 |
| 4,818,866 | 4/1989 | Weber | 250/221 |
| 5,015,840 | 5/1991 | Blau | 250/221 |

*Primary Examiner*—David C. Nelms
*Assistant Examiner*—Michael Messinger
*Attorney, Agent, or Firm*—Krass & Young

[57] ABSTRACT

An apparatus and method for automatically testing a safety light curtain used to protect to an unsafe moving part of an industrial machine. A combined beam splitter and photodetector is temporarily attached to the receiver of the light curtain with beam splitter in the path of one of the light beams. A portion of the light beam continues to a receiver of the light curtain and a diverted portion of the light beam illuminates a photodetector. Interruption of this particular light beam simultaneously triggers a safety system to initiate the stopping of the machine and triggers the photodetector. A motion detector temporarily coupled to a rotating part of the machine determines when the machine has stopped. This motion detector may include a d.c. tachometer coupled via a resilient friction wheel. A timer connected to the photodetector and the motion detector determines the duration of the interval between interruption of the one light beam and the stopping of the machine. Either this time or a computed safety distance based upon a predetermined hand speed is displayed. This measured time or the computed distance can be used to determine if the light curtain is positioned far enough from any dangerous moving parts of the machine so that an emergency stoppage of the machine protects the operator from harm.

20 Claims, 3 Drawing Sheets

APPARATUS FOR AUTOMATICALLY TESTING SAFETY LIGHT CURTAIN AND MEASURING MACHINE STOPPAGE TIME

TECHNICAL FIELD OF THE INVENTION

The technical field of this invention is that of safety testing devices, especially devices for automatically testing safety light curtains.

BACKGROUND OF THE INVENTION

This invention concerns the safety of moving industrial machines. There is a continuing need to provide safety to workers using industrial machines. Particularly in manufacturing apparatuses it is impractical to place all moving parts behind permanent barriers. Thus various techniques have evolved that tend to force safe operation of these machines.

One technique used in industrial machines requires both hands of each operator associated with the operation of a machine to operate the machine. Generally each operator must simultaneously press two push buttons to start operation of the machine. These two push buttons are located far enough apart that the operator is forced to use both hands. Release of either of these two push buttons during the closing operation of the machine stops the drive mechanism. Every push button is positioned so far from the machine that the closing operation is stopped before any of the operators' hands can reach a region in the machine where a hand could be trapped or crushed.

An additional technique generally used in industrial machines is a light curtain. A light curtain consists of plural light beams disposed to cover an extended area. These light beams are closely spaced so that a hand cannot pass through the protected zone without interrupting at least one of these light beams. Interruption of any one of these light beams initiates the stopping of the machine. This light curtain is disposed at a distance from any dangerous moving parts so that an operator's hand cannot breach the light curtain and reach a dangerous moving part before operation halts.

When such techniques are practiced, it is critical that the protective device be positioned far enough away from the dangerous moving parts of the machine so that the machine has time to decelerate to a stop before a hand can reach any moving parts. The position is based on the distance an operator's hand can move during the time required to completely stop the machine. There are standards for hand speed used in the computation of the minimum distance between the protective device and the dangerous moving part. Such computation requires an accurate determination of the time between triggering the protective device and the time the machine stops. Reliable measurement of this time period is often difficult.

A special purpose measurement apparatus is known in the industrial machine art. This measurement apparatus measures the time between the release of one of the two push buttons and the stopping of the machine. An electro-mechanical device is placed over one of the plurality of push buttons, holding the button down. Upon receipt of a trigger signal, the electro-mechanical device releases the push button simulating its release by the operator. The release of the push button will initiate the stopping of the machine. This trigger signal also starts a timer. The machine motion is measured using a tachometer attached to the machine via a spring wound cord. While the machine is moving, the tachometer produces an electrical output signal whose amplitude corresponds to the machine speed. Machine motion is adjudged stopped when the output signal decreases below a certain level. The timer is stopped when the machine has come to a complete stop. Such an apparatus provides an accurate, repeatable and reliable indication of the elapsed time required to completely stop the machine. This elapsed time and the standard hand speed determines the minimum safe distance between the two push buttons and any danger zone of the machine. Such an apparatus provides an accurate, repeatable and reliable indication of the duration of the machine's stopping interval.

Such a reliable and recognized apparatus is not known in the light curtain art. The current state of the art uses various ad hoc methods to determine the elapsed time to stop the dangerous moving parts. These methods are not generally recognized as reliable and repeatable, not applicable to the variety of industrial processes protected by light curtains or are expensive and time consuming. Thus the art needs an apparatus that can quickly and inexpensively provide an accurate, repeatable and reliable indication of duration of the stopping interval of these machines. Such an indication of the stopping interval can then be used with a standard hand speed to determine the correct placement of the light curtain.

SUMMARY OF THE INVENTION

A safety light curtain includes a plurality of spaced light beams covering access to an unsafe moving part of an industrial machine. Interruption of one or more of the light beams causes a safety system to initiate the stopping of the machine in order to prevent the amputation of or injury to operators' limbs by the moving parts of an machine. This invention is an apparatus and method for determining the duration of the interval between the interruption of a light curtain of an machine and the subsequent stoppage of the machine. By combining the measured duration of the deceleration interval with the standard hand speed constant, the minimum safe distance that the light curtain can be placed is determined.

A combined beam splitter and photodetector is temporarily attached to the receiver of the light curtain. The beam splitter is disposed in the path of one of the light beams to pass a portion of the light beam to the receiver and divert a portion of the light beam to the photodetector. Interruption of this particular light beam triggers the safety system and is simultaneously detected by the photodetector.

A motion detector is temporarily coupled to a rotating part of the machine. In the preferred embodiment this motion detector includes a d.c. tachometer coupled to the rotating part via a resilient friction wheel on the shaft of the tachometer. The motion detector determines that the machine has stopped when the output signal of the tachometer decreases below a certain level. This insures that the machine has a speed less than a predetermined reference speed.

A timing circuit connected to the photodetector and the motion detector measures the time between the interruption of the light beam and the stopping of the machine. This time is displayed and may be converted into a safety distance employing a predetermined hand speed. In the preferred embodiment a switch selects whether the measured time or computed distance is displayed. This measured time or the computed distance can be used to determine if the light curtain is positioned far enough from any dangerous moving parts of the machine so that an emergency stoppage of the machine provides protection for the operator.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
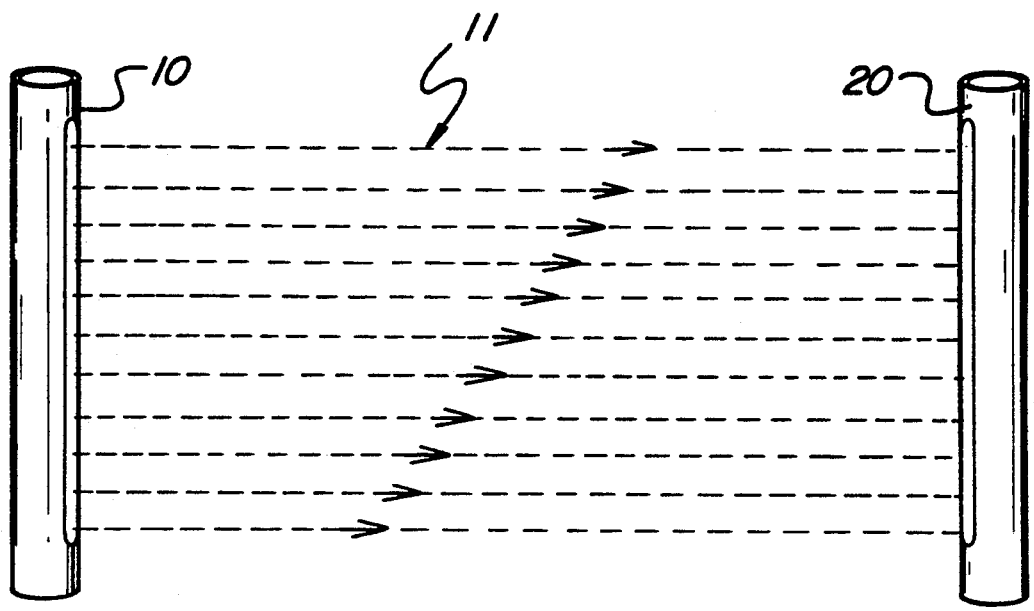
FIG. 1 illustrates in a simplified form a prior art light curtain.

FIG. 1 illustrates in simplified form a protective light curtain of the known art. A projector 10 produces many light beams 11. Receiver 20 continually monitors the intensity of each light beam and detects interruption of any one light beam 11 as indicated by a sharp decrease in light intensity. This is generally accomplished using a photodetector within receiver 20 for each light beam 11. Projector 10 and receiver 20 are disposed so that light beams 11 cover the access to a potentially dangerous area of a moving machine. In particular, light beams 11 are so arranged that an operator cannot reach the potentially dangerous area of the moving machine without interrupting at least one light beam 11. Light curtains generally have about ¾ of an inch between light beams 11. According to the known art, interruption of any one or more light beams 11 causes the safety system of the light curtain to initiate the stopping of the machine. Light curtains are generally used when this potentially dangerous area must be accessed repeatedly when in a safe condition, such as when the machine is stopped.

The light curtain should protect the operator from accidental injury from the potentially dangerous machine by stopping the machine. The minimum distance between the light curtain and any potentially dangerous area must be selected to achieve this goal. The light curtain should be located at a distance from any potentially dangerous area relative to a legally recognized hand speed constant so that the machine is stopped, and therefore safe, before the operator's hand can reach the potentially dangerous area. Determination of this distance depends on the length of time from the first interruption of a light beam until the machine stops. This invention measures that interval.

Figure 2:
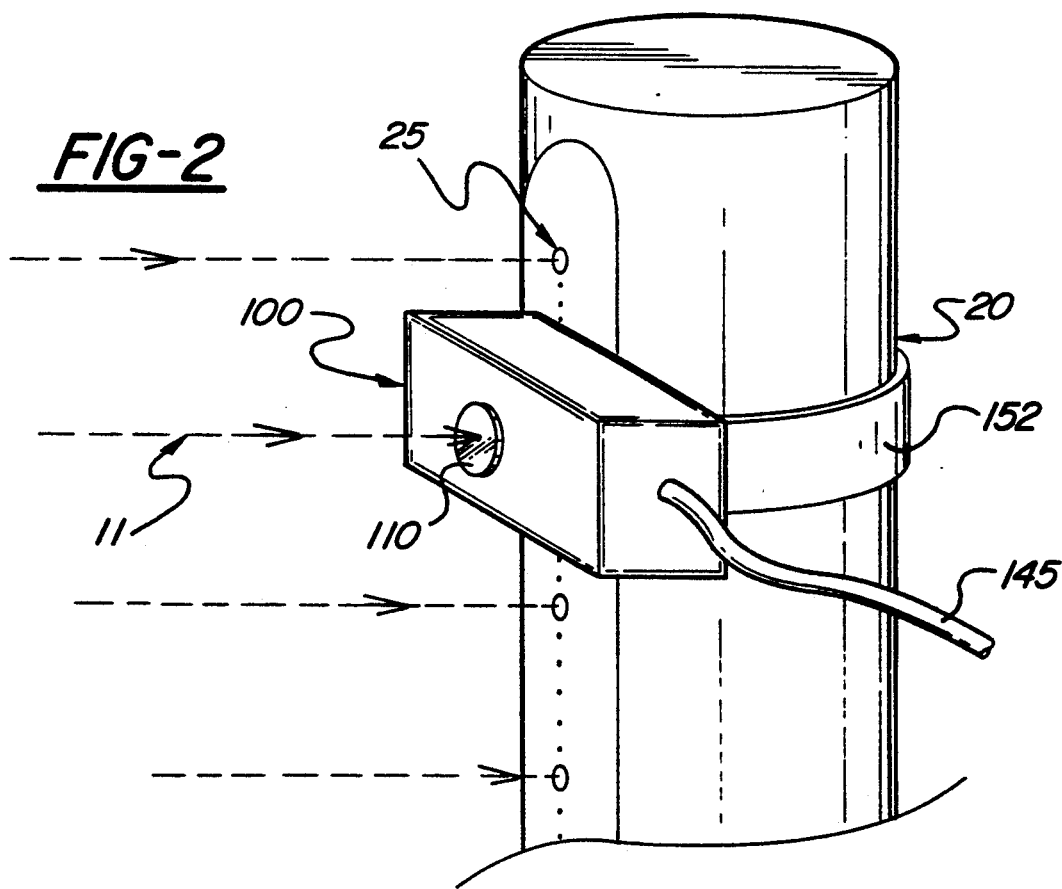
FIG. 2 illustrates the manner of placement of the combination beam splitter and photodetector of this invention in the path of one light beam of the light curtain.
Figure 3:
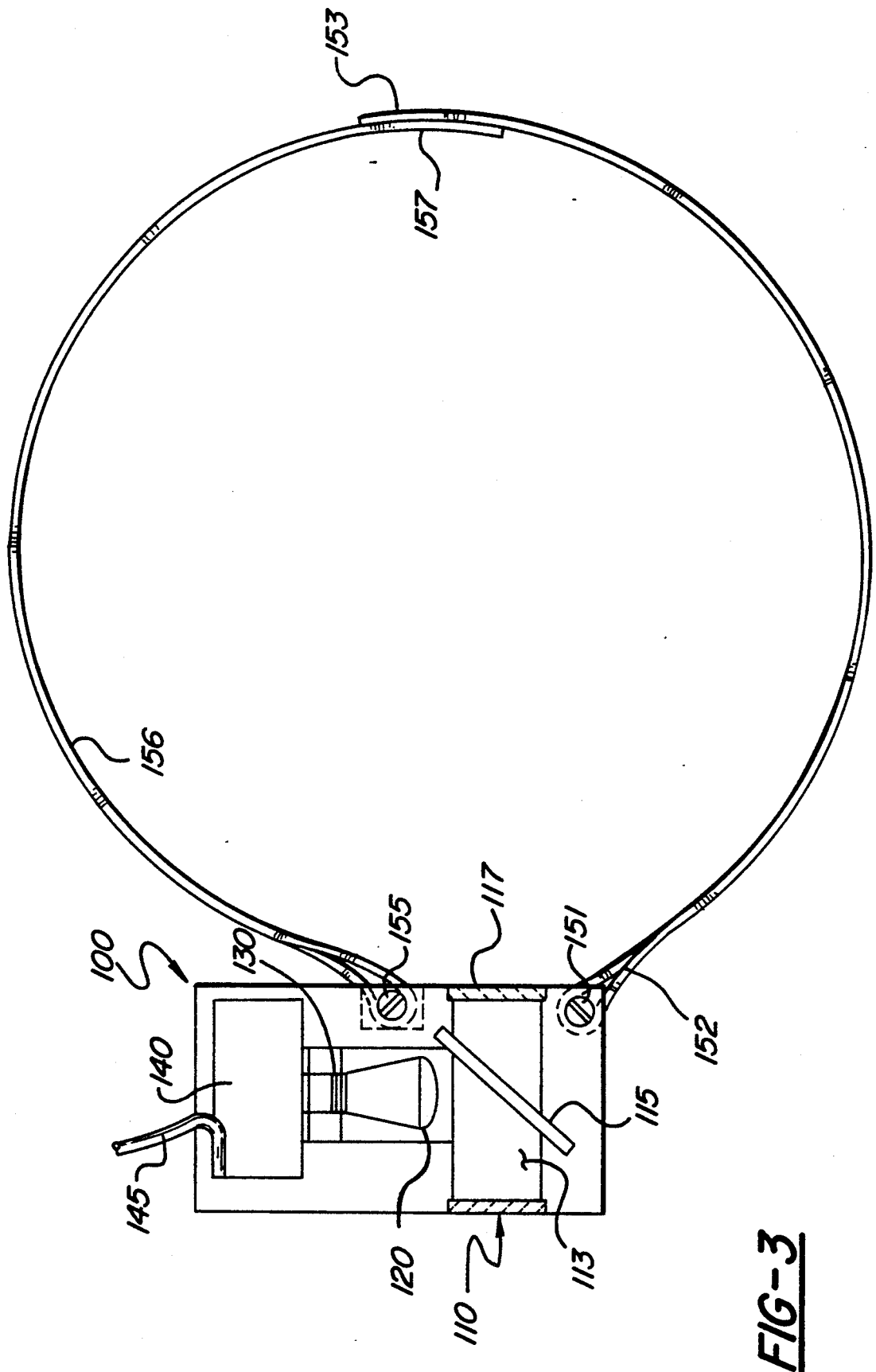
FIG. 3 illustrates in cut away form the construction of the combination beam splitter and photodetector of this invention.

This invention employs a combined beam splitter and photodetector illustrated in FIGS. 2 and 3. FIG. 2 illustrates this combined beam splitter and photodetector 100 coupled to receiver 20. Combined beam splitter and photodetector 100 is disposed in the path of one light beam 11, but does not interfere with any other light beams 11.

Combined beam splitter and photodetector 100 is disposed so that window 110 receives one of the light beams 11. As better shown in the cut away illustration of FIG. 3, window 110 leads to cavity 113. Beam splitter 115, which forms an angle with light beam 11, is disposed within cavity 113. A portion of the one light beam 11 passes through beam splitter 115 according to its normal path. This portion of the one light beam 11 passes through window 117 and falls on the photodetector 25 of receiver 20. Beam splitter 115 diverts a portion of light beam 11 to lens 120 which focuses the diverted portion onto a photodetector 130. Photodetector 130 operates in parallel with the photodetector 25 of receiver 20. Electronics on circuit board 140 converts the output signal from photodetector 130 into an ON/OFF signal indicative of whether the one light beam 11 is interrupted. Circuit board 140 detects interruption of the one light beam 11 when photodetector 130 detects a rapid decrease in light intensity. Cable 145 transmits this ON/OFF signal.

Window 110 may include a filter for passing only infrared light. Light curtains such as illustrated in FIG. 1 often use infrared light rather than visible light. Provision of a filter passing only infrared light prevents photodetector 130 from being responsive to visible light. Prior art light curtains that employ infrared light may include similar filters for the same reason. Windows 110 and 117 prevent contamination of beam splitter 115 by any dust, debris or the like.

In operation, combined beam splitter and photodetector 100 is temporarily attached to receiver 20. Straps 152 and 156 are attached to the body of combined beam splitter and photodetector 100 via posts 151 and 155, respectively. The straps 152 and 156 wrap around receiver 20, which typically forms a post-like structure as illustrated in FIG. 1. They are fastened at over lapping end portions 153 and 157 having a known miniature hook and loop structure. This attachment structure permits accommodation to a variety of receivers 20. When attached, one light beam 11 passes through combined beam splitter and photodetector 100. Beam splitter 115 reduces the amount of light reaching the photodetector of receiver 20. This is not generally a problem to operation of this invention because the typical receiver 20 is constructed to operate over a wide range of light intensity. Thus the reduced light level due to the beam splitter will generally not be detected as beam interruption. Therefore the machine will operate normally with combined beam splitter and photodetector 100 installed.

Figure 4:
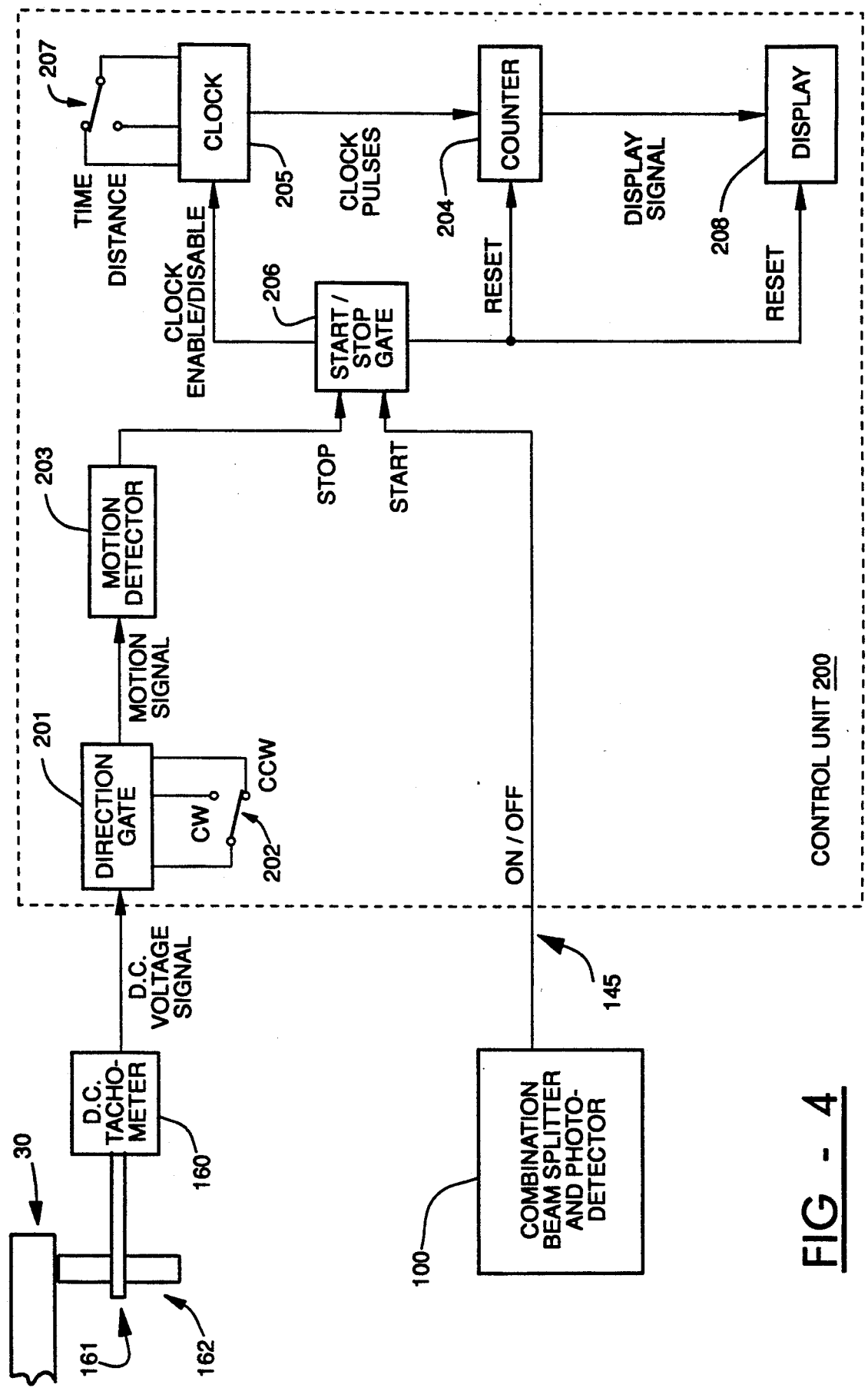
FIG. 4 illustrates in block diagram form the system of this invention.

FIG. 4 illustrates in block diagram form the system of this invention. The complete system includes combined beam splitter and photodetector 100, d.c. tachometer 160 and control unit 200. Cable 145 coupled combined beam splitter and photodetector 100 to control unit 200. Cable 145 carries an ON/OFF signal that indicates that noninterruption or interruption of the particular light beam 11.

D.C. tachometer 160 detects machine movement. Shaft 161 of d.c. tachometer is temporarily coupled to rotating part 30 of the machine via resilient wheel 162. Resilient wheel 162 is preferably formed of rubber. Movement of the machine is represented by rotation of part 30, which, in turn, rotates shaft 161 of d.c. tachometer 160 via resilient wheel 162. This d.c. tachometer 160, known in the prior art, creates a variable d.c. voltage signal that is proportional to the rotational velocity of rotating part 30. The polarity of the variable d.c. voltage signal indicates the direction of rotation of rotary part 30. This variable d.c. voltage signal from d.c. voltage tachometer 160 is supplied to control unit 200.

In the preferred embodiment control unit 200 is a self-contained, portable unit that is coupled to combined beam splitter and photodetector 100 and d.c. tachometer 160 via suitable cables. Direction gate 201 receives the variable d.c. voltage signal from d.c. tachometer 160. Direction gate 201 discriminates the direction of motion sensed by d.c. tachometer 160 based on the polarity of the tachometer variable d.c. voltage signal to ensure that the signal polarity is compatible with the motion detector 203. Switch 202 selects either clockwise rotation or counter clockwise rotation (illustrated). If the rotation detected by d.c. tachometer 160 corresponds to the position of switch 202, the direction gate 201 produces a motion signal representing the correct rotation of shaft 161. Otherwise direction gate 201 produces no output.

Motion detector 203 indicates when the machine stops motion. Motion detector 203 makes this determination based upon the level of the motion signal. If this level is greater than a certain level, then no stoppage of motion is indicated. If the level of the motion signal decreases below a certain level, then the stoppage of motion is indicated. A predetermined voltage threshold is set with regard to the variable d.c. voltage signal produced by d.c. tachometer 160 to detect when the rotary speed of the machine reaches a suitably low level. This manner of detection is simple and inexpensive and provides a suitable indication of when the machine is stopped.

Combined beam splitter and photodetector 100 produces an ON/OFF signal indicative of whether light beam 11 is interrupted. Cable 145 transmits this ON/OFF signal. Start/stop gate 206 produces a reset command and a clock enable command when an OFF (start) signal is received and when no STOP signal from motion detector 203 is present. The reset command from start/stop gate 206 sets counter 204 and display 208 to a zero condition. The clock enable command from start/stop gate 206 allows clock 205 to begin producing clock pulses at a frequency determined by the position of switch 207. Counter 204 begins counting the clock pulses produced by clock 205. Counter 204 produces a display signal to interface with display 208. Counter 204 produces the display signal while counting the clock pulses from clock 205. Display 208 displays the current count of counter 204, and continually updates the display as it receives the display signal from counter 204. Counter 204 continues to count until clock 205 stops producing clock pulses. Clock 205 stops producing clock pulses when start/stop gate 206 produces a clock disable signal upon receiving a STOP signal from motion detector 203 indicating the machine has stopped. Thus clock 205, counter 204, and display 208 comprise a timer controlled by the start/stop gate 206.

Display 208 provides a visual display of the desired interval. Display 208 displays either time or distance as determined by switch 207. Switch 207 is set to the desired display setting, time or distance, prior to the initiation of the desired interval. The indication of time would typically be expressed in milliseconds. The indication of distance would typically be in inches and tenths. Display 208 preferably consists of several seven segment digits formed of light emitting diodes or liquid crystal displays.

Switch 207 selects the mode of display. FIG. 4 illustrates switch 207 in a time display position. In this position, clock 205 produces clock pulses at a rate indicative of time. When switch 207 is in the distance position, clock 205 produces clock pulses indicative of the computed distance. The conversion from time to distance is typically based on the predetermined hand speed constant of 63 inches per second. Counter 204 counts the clock pulses indicative of the computed distance and causes display 208 to display the safety distance in inches. This distance is the minimum safe distance from the light curtain to an unsafe area of the machine. Placing the light curtain at this distance insures that the operator cannot reach a dangerous area before the machine has stopped.

The apparatus of this invention is used as follows. Combined beam splitter and photodetector 100 is attached to receiver 20 as previously described. D.C. tachometer 160 is coupled to rotating part 30 in the manner described. The machine is started in the normal manner. The variable d.c. voltage signal from d.c. tachometer 160 is tested for polarity and switch 202 is changed if necessary depending on the direction of rotation of rotating part 30. If necessary combined beam splitter and photodetector 100 is adjusted so that it does not trigger the light curtain safety system. Switch 207 is selected to the desired display mode, time or distance. The one light beam 11 of combined beam splitter and photodetector 100 is interrupted, for example, by manually obstructing the light beam. This does two things. It triggers the light curtain safety system that initiates the stopping of the machine. Photodetector 130 also detects the interruption of the beam and transmits a start signal to start/stop gate 206. Start/stop gate 206 resets counter 204 and display 208, and enables clock 205. Clock 205 produces clock pulses as determined by the position of switch 207. Counter 204 counts the clock pulses and transmits a display signal to display 208. Display 208 continually updates the display as long as counter 204 transmits the display signal. When motion detector 203 determines the machine has stopped, then counter/timer 204 and display stop. Display 208 now displays either the measured time or the computed distance depending on the position of switch 207.

This technique provides an easily used method for testing the light curtain. Because the same event, interruption of light beam 11, triggers the safety system and starts counter/timer 204 the beginning of the tested interval is reliably determined. The tachometer provides a reliable determination of when the machine stops. Thus the timed interval can be determined with confidence. This in turn permits proper location of the light curtain to protect the machine operator.

Those skilled in the art would realize there are several alternative means to practice this invention. In particular, it is feasible that a single microprocessor integrated circuit, when appropriately programmed, could serve the functions of direction gate 201, motion detector 203, start/stop gate 206, clock 205 and counter 204.

What is claimed is:

1. An apparatus for determining a minimum safe distance between a safety light curtain that includes a plurality of spaced light beams and an machine having dangerous moving parts, said apparatus comprising:
   light detecting means for sensing interruption of one of the light beams in the light curtain;
   motion detecting means coupled to the machine for detecting machine stoppage; and means coupled to the light detecting means and to the motion detecting means for measuring the time between the interruption of the one light beam and the stoppage of the machine, whereby the measured time is related to a minimum safe distance between the light curtain and the machine.

2. The invention of claim 1 wherein the light curtain has a plurality of light beam sensors attached to a support and wherein the light detecting means has mounting means for temporary attachment to the support adjacent to a light beam sensor.

3. The invention as in claim 2 wherein the light detecting means includes two flexible straps for attachment to the support and which employ a mating connector to secure the straps together.

4. An apparatus for determining a minimum safe distance between a safety light curtain that includes a plurality of spaced light beams and an machine having dangerous moving parts, said apparatus comprising:
   a beam splitter disposed in the path of one of the plurality of spaced light beams, said beam splitter passing a portion of the one light beam and diverting a portion of the one light beam:
   a photodetector disposed to receive said diverted portion of the one light beam for detecting interruption of said diverted portion of the one light beam;
   a motion detector coupled to the moving machine for detecting the stopping of the; and
   a timer connected to said photodetector and said motion detector for producing an indication of the time between interruption of said diverted portion of the one light beam and the stopping of the machine.

5. The apparatus as claimed in claim 4, wherein the light beams are of infrared light, said apparatus further comprising:
   an infrared light filter disposed in the path of the one light beam before said photodetector to prevent said photodetector from being responsive to visible light.

6. The apparatus as claimed in claim 4, wherein:
   said photodetector detects said interruption of said diverted portion of the one light beam upon a rapid decrease in light intensity.

7. The apparatus as claimed in claim 4, wherein:
   said motion detector consists of a tachometer coupled to a rotating part of the machine producing a variable d.c. output voltage signal which has a magnitude proportional to the rotational velocity of said rotating part of the machine, and which can be used to determine the instant that the machine comes to rest.

8. The apparatus as claimed in claim 7, wherein:
   said tachometer includes a resilient friction wheel for coupling to a rotating part of the machine.

9. The apparatus as claimed in claim 7, wherein:
   said motion detector detects the stopping of the machine upon the reduction of the tachometer variable d.c. output voltage to a predetermined level and polarity.

10. The apparatus as claimed in claim 4, wherein: said timer further includes means to convert said indication of the time between interruption of said diverted portion of the one light beam and the stopping of the machine into a safety distance employing a predetermined hand speed.

11. In an apparatus for determining a minimum safe distance between a safety light curtain that includes a plurality of spaced light beams and a machine having dangerous moving parts, apparatus for detecting invasion of the light curtain comprising:
   a beam splitter disposed in the path of one of the plurality of spaced light beams, said beam splitter passing a portion of the one light beam and diverting a portion of the one light beam; and
   a photodetector disposed to receive said diverted portion of the one light beam for detecting interruption of said diverted portion of the one light beam.

12. The apparatus as claimed in claim 11, wherein the light beams are of infrared light, said apparatus further comprising:
   an infrared light filter disposed in the path of the one light beam before said photodetector to prevent said photodetector from being responsive to visible light.

13. The apparatus as claimed in claim 11, wherein:
   said photodetector detects said interruption of said diverted portion of the one light beam upon detection of a rapid decrease in light intensity.

14. A method for determining a minimum safe distance between a safety light curtain that includes a plurality of spaced light beams and an industrial machine having dangerous moving parts, said method comprising the steps of:
   diverting a portion of one light beam;
   interrupting the one light beam to thereby interrupt the said portion of the one light beam;
   detecting the interruption of said diverted portion of the one light beam;
   detecting the stopping of the machine; and
   timing the interval between the interruption of said diverted portion of the one light beam and the stopping of the machine.

15. The method as claimed in claim 14, wherein the light beams are of infrared light, said method further comprising the step of:
   infrared filtering the one light beam to prevent said photodetector from being responsive to visible light.

16. The method as claimed in claim 14, wherein:
   said step of detecting interruption of said diverted portion of the one light beam includes detecting a rapid decrease in light intensity.

17. The method as claimed in claim 14, wherein:
   said step of detecting the stopping of the machine includes
   coupling a tachometer to a rotating part of the machine, and
   producing a variable d.c. output voltage signal in proportion to the rotational velocity of the machine.

18. The method as claimed in claim 17, wherein:
   said step of detecting the stopping of the machine wherein:
   said step of coupling a tachometer to a rotating part of the machine includes coupling a resilient friction wheel to a rotating part of the machine.

19. The method as claimed in claim 17, wherein:
   said step of detecting the stopping of the machine detects a decrease in the tachometer variable d.c. output voltage below a certain level.

20. The method as claimed in claim 14, further comprising the step of:
   converting said interval between the interruption of said diverted portion of the one light beam and the stopping of the machine into a safety distance employing a predetermined hand speed.

* * * * *